(12) United States Patent
Zhu et al.

(10) Patent No.: US 11,695,517 B2
(45) Date of Patent: Jul. 4, 2023

(54) HARQ MANAGEMENT TO ENHANCE PERFORMANCE, REDUCE OVERHEAD AND LATENCY

(71) Applicants: Dengkui Zhu, Beijing (CN); Jason Brent, Foothill Ranch, CA (US); Boyu Li, Irvine, CA (US); Ping Liang, Newport Coast, CA (US)

(72) Inventors: Dengkui Zhu, Beijing (CN); Jason Brent, Foothill Ranch, CA (US); Boyu Li, Irvine, CA (US); Ping Liang, Newport Coast, CA (US)

(73) Assignee: RF DSP Inc, Irvine, CA (US)

( * ) Notice: Subject to any disclaimer, the term of this patent is extended or adjusted under 35 U.S.C. 154(b) by 275 days.

(21) Appl. No.: 17/169,451

(22) Filed: Feb. 6, 2021

(65) Prior Publication Data
US 2022/0255677 A1    Aug. 11, 2022

(51) Int. Cl.
*H04L 1/00* (2006.01)
*H04L 1/1812* (2023.01)
*H04L 1/1867* (2023.01)

(52) U.S. Cl.
CPC .......... *H04L 1/1819* (2013.01); *H04L 1/0061* (2013.01); *H04L 1/1874* (2013.01); *H04L 1/1896* (2013.01)

(58) Field of Classification Search
CPC ..... H04L 1/819; H04L 1/0061; H04L 1/1874; H04L 1/1896
See application file for complete search history.

(56) References Cited

U.S. PATENT DOCUMENTS

| | | | |
|---|---|---|---|
| 2013/0176981 A1* | 7/2013 | Earnshaw | H04L 1/1835 370/329 |
| 2014/0185530 A1* | 7/2014 | Kuchibhotla | H04W 72/0446 370/329 |
| 2014/0241269 A1* | 8/2014 | Smee | H04W 72/23 370/329 |
| 2017/0230149 A1* | 8/2017 | Wang | H04L 1/1614 |
| 2017/0338907 A1* | 11/2017 | Atungsiri | H03M 13/2707 |

* cited by examiner

Primary Examiner — Ricardo H Castaneyra
Assistant Examiner — Aaron C. Turner
(74) Attorney, Agent, or Firm — George Guosheng Wang; Upstream Research and Patent LLC

(57) ABSTRACT

This invention discloses methods to enhance Physical Layer (PHY) processing in a radio access network between a Base Station (BS) and one or more User Equipment (UEs), including enhanced Hybrid Automatic Repeat Request (HARQ) management, transmitting path processing to reduce transfer bandwidth between an offload processor and a CPU, and offload processing to reduce HARQ latency.

7 Claims, 4 Drawing Sheets

HARQ MANAGEMENT TO ENHANCE PERFORMANCE, REDUCE OVERHEAD AND LATENCY

This application claims the benefit of U.S. Provisional Application No. 62/939,637 filed on Nov. 24, 2019.

FIELD OF INVENTION

This invention relates to methods and systems for Hybrid Automatic Repeat Request (HARQ), and more specifically to methods and systems to offload and managing processing on a co-processor to enhance HARQ performance and latency.

DETAILED DESCRIPTION

Enhanced HARQ Management

The Hybrid Automatic Repeat Request (HARQ) management module is located in the decoding chain, which mainly completes buffering the Log-Likelihood Ratios (LLRs) information of the unsuccessfully decoded transport block (TB) for each User Equipment (UE), LLR combining for each retransmitted code-block (CB) before sending them into a decoder, e.g., a Low Density Parity Check (LDPC) decoder, Cyclic Redundancy Check (CRC) checking for each CB and each TB after the decoder.

Figure 1:
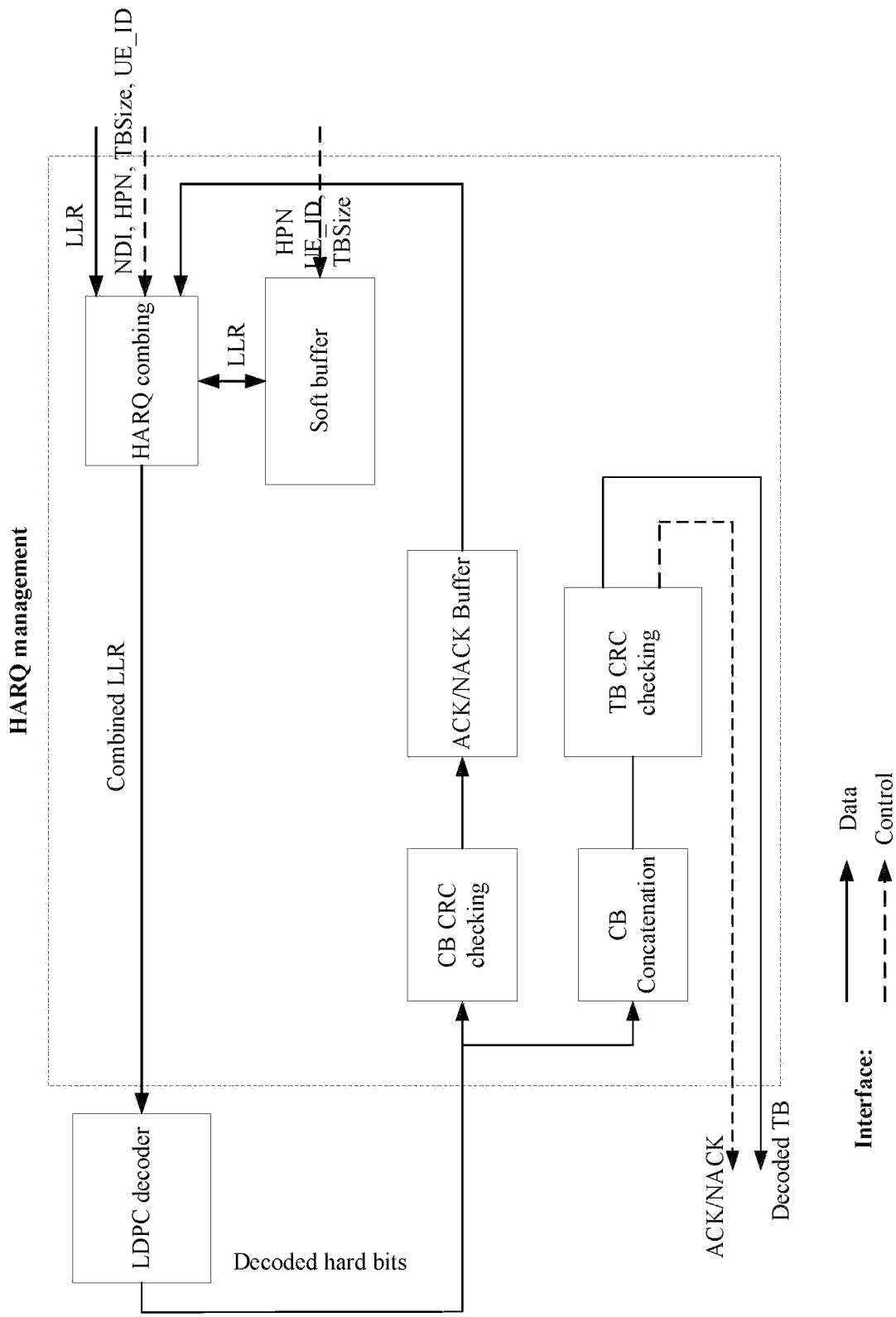
FIG. 1. Block diagram of HARQ management
Figure 2:
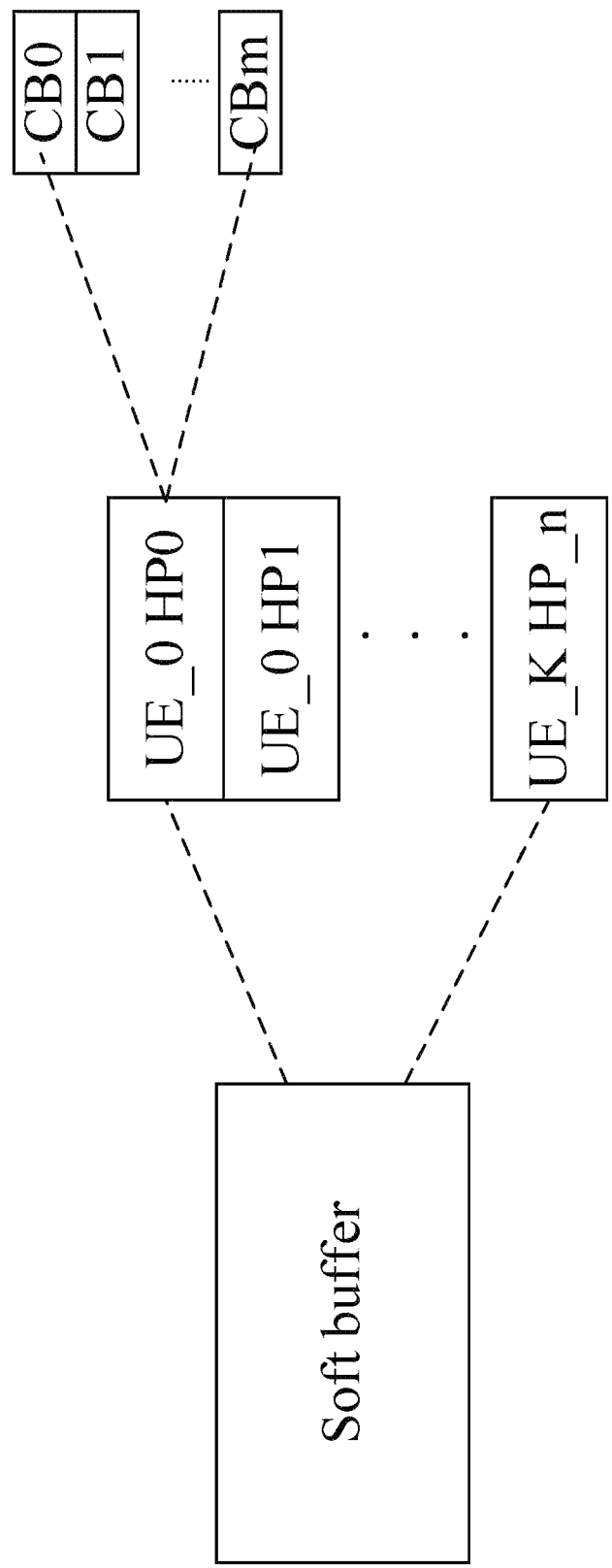
FIG. 2. Logical structure of soft buffer

An embodiment of the interior block diagram of HARQ management of this invention is shown in FIG. 1, where the soft buffer stores LLRs for each HARQ process of each UE for HARQ combining, as shown in FIG. 2, the HARQ combing block combines the LLRs of the retransmitted TB and the stored LLRs in the soft buffer and passes the combined LLRs to LDPC decoder for decoding each CB in a TB, the CB CRC checking module completes CRC checking for each CB and the result is stored in ACK/NACK buffer, CB concatenation module removes the CRC attached to each CB and concatenates them into a TB, and the TB CRC checking blocks conducts CRC checking for a TB, removes the attached CRC and passes the decoded information bits and CRC checking result to the high portion of a physical layer (high PHY).

An embodiment of this invention is an enhanced HARQ combing algorithm, whose principle of operation is shown below.

Input:
1. New LLRs from high phy;
2. Control information: New Data Indicator (NDI), HARQ Process Number (HPN), ID of a UE (UE_ID), Size of a TB (TBSize)

Processing:
1. Read old LLRs from soft buffer (UE_ID, HPN, TBSize);
2. If NDI toggled (new transmission)
    Discard the old LLRs, pass the new LLRs into LDPC decoder, store NDI, TBSize
3. else if input TBSize is not correct (new transmission)
    Discard the old LLR, pass the new LLRs into LDPC decoder, store NDI, TBSize
4. else (retransmission)
    if CB ACK/NACK=1 (already correctly decoded CB)
        Discard the new LLRs of the CB and pass old LLRs to LDPC decoder
    else
        combine the new LLRs and old LLRs and pass them to LDPC decoder
    end
end The data interface of an embodiment comprises an input interface for LLR for each HARQ process (HP) or TB, and an output interface for decoded information bits. The control interface of an embodiment comprises an input interface for NDI: new data indicator, rv: HARQ Redundancy version; HPN: HARQ processing number; UE_ID: UE identity; and TBSize: size of transport block, and an output interface for ACK/NACK of TB/HARQ process.

Memory Size of Soft Buffer

According to 3rd Generation Partnership Project; Technical Specification Group Radio Access Network, NR; Physical layer procedures for data (Release 15), the maximum number of HARQ processes for each UE is $H_{pn}=16$, therefore the Base Station (BS) needs to store at most $H_{pn}$ slots of LLRs for HARQ combining. Let's take a 100 MHz system with 30 KHz subcarrier spacing as an example, where the number of usable subcarrier per OFDM symbol is $N_{sc}=273*12=3276$, the number of symbols is $L=14$ in each slot, the maximum number of raw information bits per subcarrier is $N_b=7.4063$ as defined in Table 5.1.3.1-2 of 3rd Generation Partnership Project; Technical Specification Group Radio Access Network, NR; Physical layer procedures for data (Release 15). Considering rate=1/3 LDPC encoder defined in 3rd Generation Partnership Project; Technical Specification Group Radio Access Network; NR; Multiplexing and channel coding (Release 15), the maximum buffer size can be estimated as $$B_{size}=3*N_b*N_{sc}*L*H_{pn}*S*B_{w},$$

where S is the maximum number of data streams multiplexed via MIMO/beamforming and $B_{w}$ is the bit width of LLR. Assuming $B_{w}=8$ as defined in the LDPC Encoder/Decoder v2.0, LogiCORE IP Product Guide provided by Xilinx, the memory sizes $B_{size}$ of soft buffer are listed in Table 1 under various selection of S.

TABLE 1

| | Buffer size | | |
|---|---|---|---|
| S(data streams) | 2 | 4 | 8 |
| $B_{size}$ (MB) | 25 | 50 | 100 |

Bandwidth of Memory (DDR)

Considering the required large memory size, soft buffer can be implemented by DDR4. Therefore, the peak bandwidth of DDR required to match HARQ combining and LDPC decoder can be estimated as $$BW_{ddr}=2*3*N_b*N_{sc}L*S*B_{w}/T_{slot},$$

where $T_{slot}$ is the time duration of a slot, e.g., 0.5 ms for 100 MHz systems. With the same assumption in section 3, the required bandwidth are listed in Table 1 under various selection of S.

TABLE 2

| peak bandwidth of DDR | | | |
|---|---|---|---|
| S(data streams) | 2 | 4 | 8 |
| $BW_{ddr}$ (GB/s) | 8.2 | 16.4 | 32.8 |

In one embodiment of this invention, to speed up the computation intensive decoding processing, the decoding chain of a receiver is implemented on a separate processing board, referred to as an offload board, from the processor performing other physical layer functions, and the enhanced HARQ management described above is also implemented in the offload board together with the decoding chain.

The embodiments of HARQ management of this invention achieve top performance compared with reference simulation results provided in 3GPP Release 15, and reduces required buffer size, dramatically reduces number of accesses to the memory, resulting in a smaller pipeline depth and higher throughput.

Reducing HARQ Latency by Offloading Encoding and Modulation

An embodiment of this invention offloads an encoder to an offload processor, e.g., a co-processor board through the PCIe bus, processes the full transmit (Tx) path in addition to the encoder in the offload processor. This frees up more CPU resources to process the receiving functions and saves transfer bandwidth, e.g., the PCIe bandwidth, between the CPU and the offload processor because it eliminates the need for the offload processor to send the encoded bits back to the CPU for the rest of Tx path processing. The Tx path is a fixed function, there are few advantages to locate the Tx path in the CPU as is done in prior art.

Figure 3:
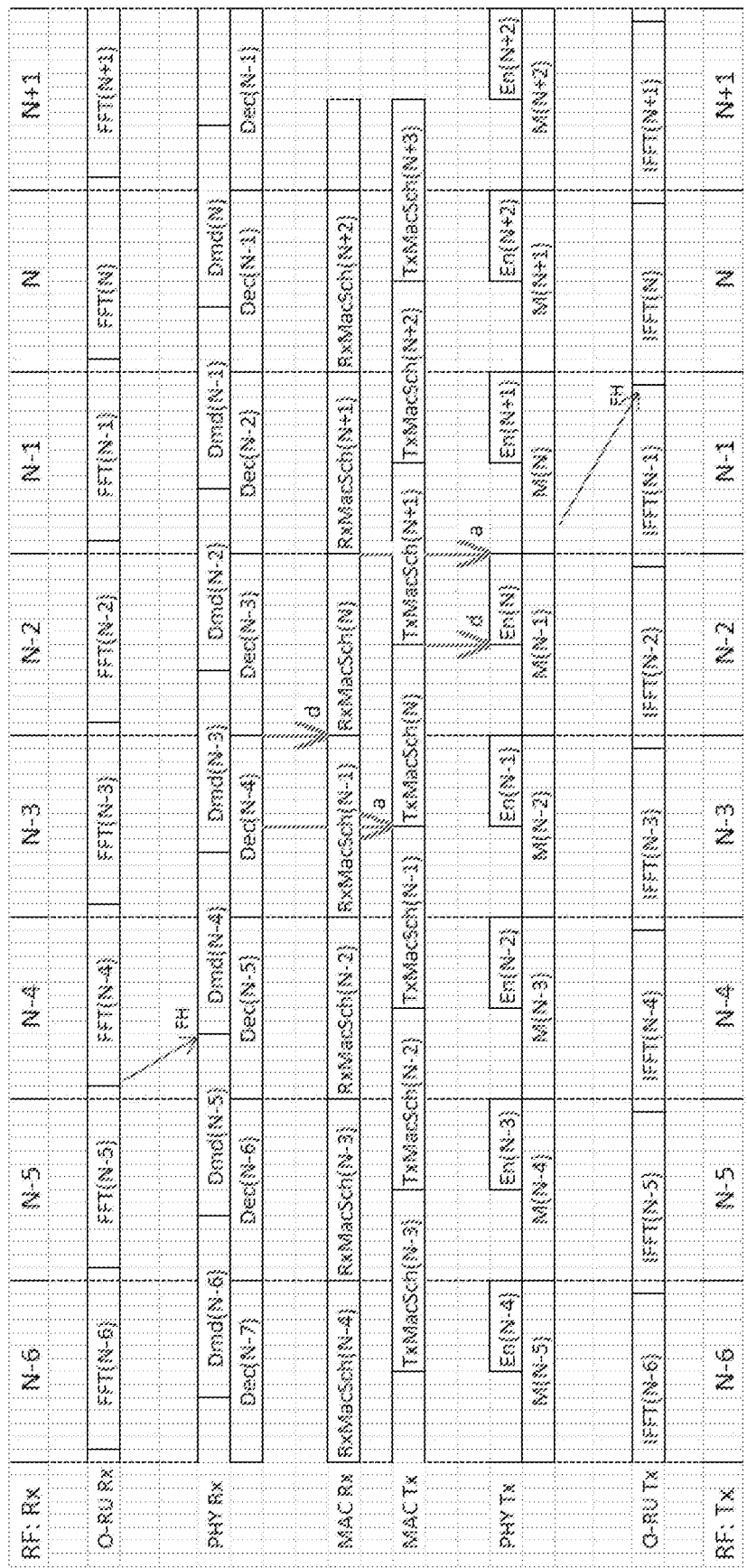
FIG. 3. Example timing budget diagram of prior art 5G NR system with a latency of 4 slots.
Figure 4:
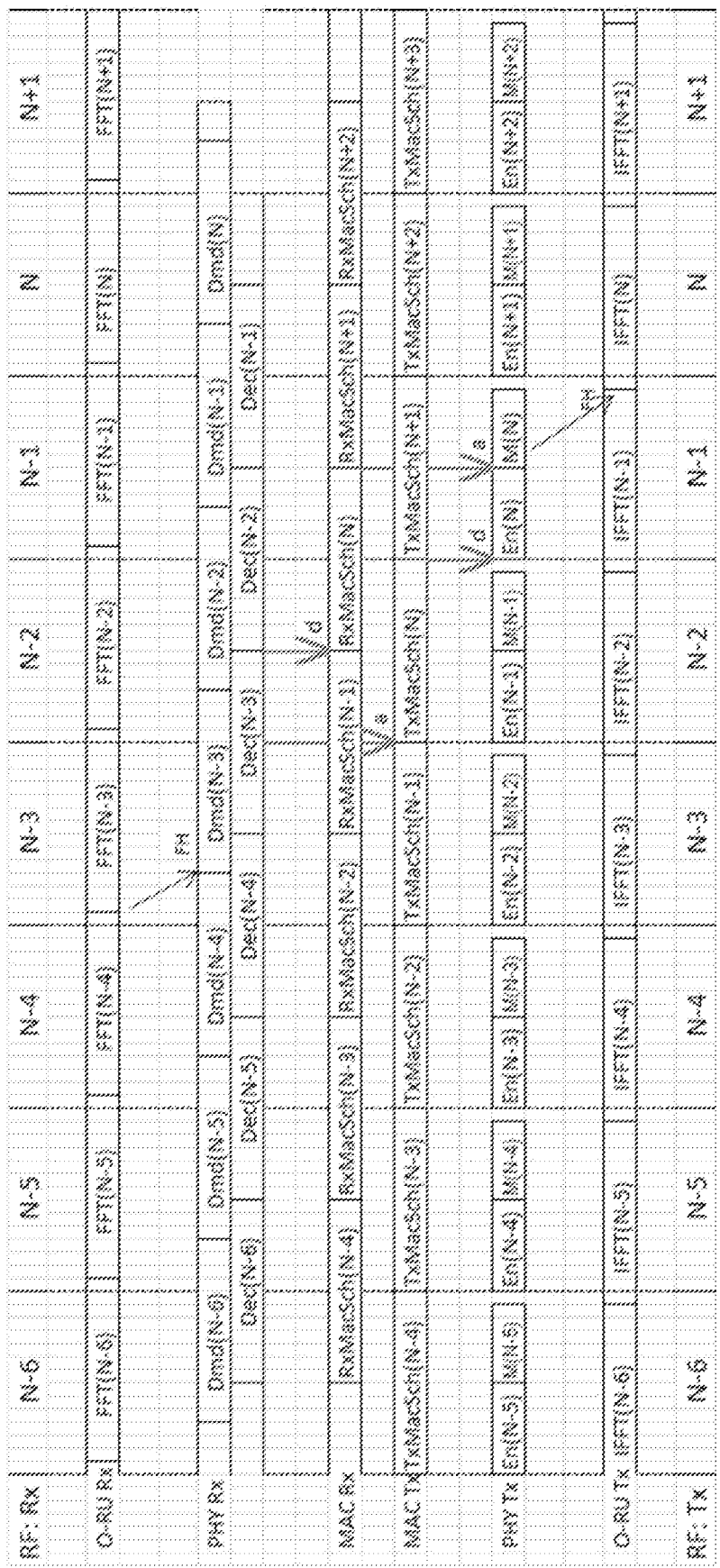
FIG. 4. Example timing budget diagram of an embodiment of a 5G NR system comprising implementing the entire high PHY of the Tx path in an offload processor and arranging the process timing to reduces the latency.

In prior art, Tx processing requires a latency budget of 4 slots, that is, processing for slot N starts at slot N−4 as shown in FIG. 3 which shows the processing steps to meet a receive-transmit latency requirement. The processing steps are situated in the Media Access Control (MAC) layer and the Physical (PHY) layer both a receiving path (Rx) and a transmit path. The PHY layer can be divided into a high portion (high PHY) that includes encoding and modulation and a low portion (low PHY) that includes FFT processing which can be implemented in a Radio Unit (RU), e.g., an O-RAN RU (O-RU) or a fronthaul gateway or hub. One embodiment of this invention implements the high PHY of the Tx path in an offload processor, processes parts or all of the Tx path functions much faster than real-time to reduce the HARQ latency budget, and supports smaller downlink reception windows for a RU, e.g., an O-RU. This can be achieved in an offload processor that accelerates the Tx path processing by arranging the timing of the Tx processing steps. One embodiment computes encoding of slot N En(N) and modulation of slot N M(N) in the same slot in the offload processor as shown in FIG. 4 for a 5G NR system, which reduces the latency budget to 3 slots, that is, processing for slot N starts at slot N−3.

Although the foregoing descriptions of the preferred embodiments of the present inventions have shown, described, or illustrated the fundamental novel features or principles of the inventions, it is understood that various omissions, substitutions, and changes in the form of the detail of the methods, elements or apparatuses as illustrated, as well as the uses thereof, may be made by those skilled in the art without departing from the spirit of the present inventions. Hence, the scope of the present inventions should not be limited to the foregoing descriptions. Rather, the principles of the inventions may be applied to a wide range of methods, systems, and apparatuses, to achieve the advantages described herein and to achieve other advantages or to satisfy other objectives as well.

We claim:

1. A method of Physical Layer (PHY) processing in a radio access network between a Base Station (BS) and one or more User Equipment (UEs) comprising
   Using a soft buffer memory to store Log-Likelihood Ratios (LLRs) for a Hybrid Automatic Repeat Request (HARQ) process of each UE for HARQ combining;
   Using a HARQ combing block to combine the LLRs of a retransmitted transport block (TB) and the stored LLRs in the soft buffer and passes the combined LLRs to a decoder for decoding each code-block (CB) in a TB;
   Using a CB cyclic redundancy check (CRC) checking module to perform CRC checking of each CB;
   Storing a result of the CRC checking in an ACK/NACK buffer;
   Using a CB concatenation module to remove a CRC attached to each CB and concatenate them into a TB;
   Using a TB CRC checking block to conduct CRC checking for a TB; and,
   Removing an attached CRC for the TB and passes decoded information bits and CRC checking result for the TB a High portion of the physical layer (High PHY).

2. The method of claim 1 wherein the HARQ combining block executes an algorithm that accepts as new LLRs from the high PHY as input and uses New Data Indicator (NDI), HARQ Process Number (HPN), ID of a UE (UEID), and Size of a TB (TBSize) as control information, performs the following processing:
   Read old LLRs from soft buffer and read the control information UEID and TBSize;
   If NDI indicates a new transmission, discard the old LLRs, pass the new LLRs into a decoder, store the NDI and TBSize;
   else if input TBSize is not correct which indicates a new transmission,
   discard the old LLR, pass the new LLRs into the decoder, store the NDI and TBSize;
   else there is a retransmission and if CB ACK/NACK=1 indicating the CB is already correctly decoded, discard the new LLRs of the CB and pass the old LLRs to the decoder;
   else combine the new LLRs and the old LLRs and pass them to the decoder.

3. The method of claim 2 wherein the decoder is a Low-Density Parity-Check (LDPC) decoder.

4. The method of claim 1 further comprising inputting LLR for each HARQ process (HP) or TB, and outputting decoded information bits.

5. The method of claim 1 further comprising inputting for NDI, HARQ Redundancy Version (RV), HPN, UE_ID, and TB Size, and outputting ACK/NACK of the TB/HARQ process.

6. The method of claim 1 further comprising using a processor to offload a decoding chain of a receiver from a processor performing the other physical layer functions, in order to speed up a computation intensive decoding processing.

7. The method of claim 6 further comprising implementing the enhanced HARQ management of claim 1 in the same offload processor together with the decoding chain.

* * * * *